Aug. 7, 1945.  L. E. LOONEY  2,380,980
BEARING CUP PULLER
Filed July 28, 1944
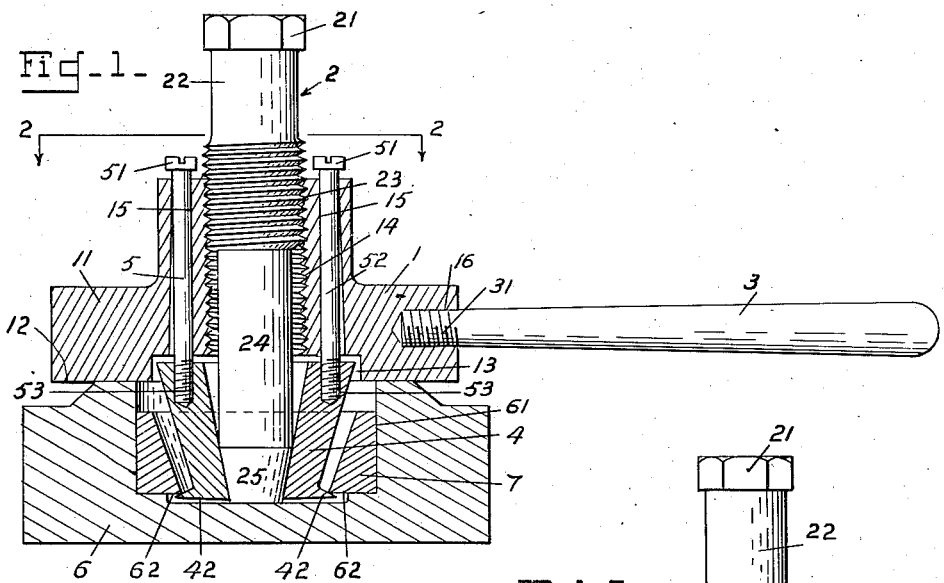
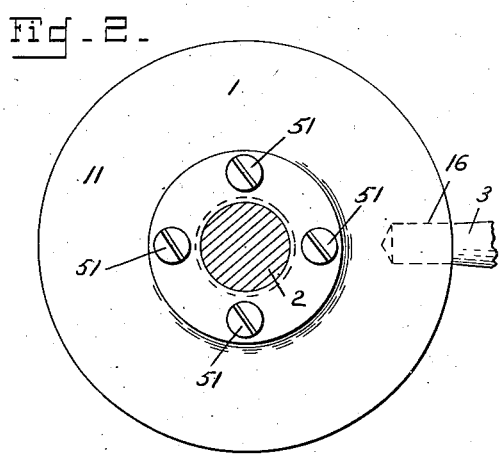
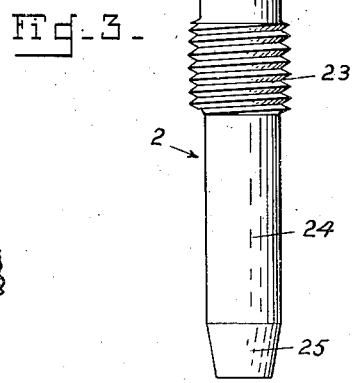
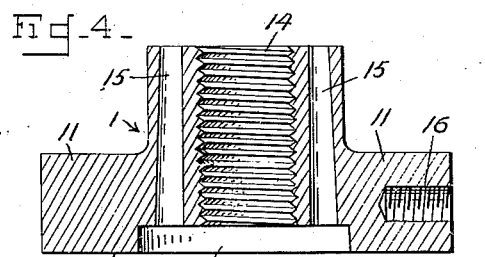
Inventor
Leo E. Looney
By C. E. Herrstrom & W. E. Thibodeau
Attorneys Patented Aug. 7, 1945

2,380,980

UNITED STATES PATENT OFFICE 2,380,980

BEARING CUP PULLER

Leo E. Looney, Revere, Mass.

Application July 28, 1944, Serial No. 547,093

1 Claim. (Cl. 29—263)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a bearing cup puller for roller or ball-bearing cups and is directed more particularly to the provision of means whereby there is facilitated the removal of ring-like members such as are commonly press-fitted into some housing, like a bearing cup.

According to prior practice, it has been both difficult and time-consuming to remove such members and it is therefore an object of this invention to provide a simple and effective puller for extracting such tightly-fitting ring-like units from such housings. Accordingly the principal object of this invention is to provide a bearing-cup puller for efficiently removing the cups of roller or ball-bearings which have been pressed into housings.

The specific nature of the invention as well as other objects and advantages thereof will clearly appear from a description of a preferred embodiment as shown in the accompanying drawing in which:

Fig. 1 is a side elevational view of the device of the invention with parts in section for clearness.

Fig. 2 is a sectional view on the line 2—2 of Fig. 1.

Fig. 3 is a side elevational view of the screw jack member.

Fig. 4 is a sectional view through the body member.

Fig. 5 is a top-plan view of what is shown in Fig. 4.

Fig. 6 is an elevational view of one of the sectors of the extractor assembly.

Referring now to the drawing more in detail, the invention will be described with respect to the preferred embodiment thereof.

In Fig. 1 there is shown in assembled relation the bearing-cup puller of the invention including what may be called a body member 1 having a screw-jack member 2 threaded rotatably therein, and a free handle which may take various forms but preferably consists of a rod and a threaded end portion 31 which is in engagement with a radial threaded hole 16 in an enlarged flanged-like lower portion 11 of said body.

Said body member 1 is provided with a plurality of vertical openings or axial holes 15, each of which is adapted to receive a screw 5, said screws having their lower ends threaded as indicated in 53.

Body member 1 has its flanged collar 11 provided with a substantially flat bottom face 12 at right angles to the vertical axis thereof and is formed to have an internal recess 13 concentric with an opening 14 whereby said body is provided with an inverted opening U-shaped in cross-section.

The screw-jack member 2 shown in Fig. 3 may vary in size and shape but preferably consists of a bolt-like member having a hex or similar tool engaging head 21, more or less reduced neck-portion 22, an intermediate threaded portion 23, a shank portion 24 while its lower end portion 25 preferably tapers downwardly as shown.

The extractor assembly 4 will now be described.

It will be understood that said member 4 is preferably formed of metal such as steel and consists of a plurality such as four right angle sectors 41. Said sectors will form an inverted conical frustum and each will also have what may be termed a radial rib 42, the upper faces of said ribs being inclined as at 43. The degree of said angle being preferably at approximately 60° to the axis of extractor member 4. The bottom faces of said ribs 42 are relatively perpendicular to the axis of a threaded hole 46 provided in each of said sectors but preferably said faces have a slight bevel on their outer edges as shown in Fig. 6. The conical axial opening 45 extends through the center of the extractor as a downwardly extending taper which matches the taper 25 on shank part 24.

As stated, each of such sectors 41 is provided with a threaded hole 46 adapted to receive the screws 5. The screws will normally have a slotted head 51 with the shanks 52 thereof extending through said holes 15 and as above mentioned their lower ends 53 in threaded engagement with the extractor sectors.

Since the shanks 52 are of greater length than the holes 15 as shown in Fig. 1 and since the holes 15 are of greater diameter at their lower end portions, as shown in Figs. 1 and 4, so as to permit lateral movement of the screws 5 as well as axial movement as the sector members 4 are expanded, there is provided the desirable play during operation of the device of the invention. The screw-jack member 2 to begin with is so adjusted in the body that the tapered portion 25 does not engage extractor 4. The puller is then aligned with the recess 61 of the bearing housing 6 and the extractor 4 is pushed through bearing cup 7 to the bottom of the recess 61.

With the extractor 4 held firmly in this position, the screw jack 2 is turned down till its taper 25 engages the sectors 41 of the extractor 4, forcing them outwardly and causing the ribs 42 of extractor-sectors 41 to catch under an inwardly projecting edge 62 of the bearing cup 7. The bearing puller can then be held by the handle 3 while the screw jack 2 is screwed down by means of a wrench, all of which forces the extractor ribs 42 outwardly under the bearing cup 7 and thereby exerts a wedging action between cup and housing, thus forcing the bearing cup 7 upwardly.

Until the screw jack 2 has been turned down to the point where the shank 24 contacts the bottom of the recess 61 in the housing 6, the applied force is exerted wholly in a radial direction, but as seen as the bottom of the screw shank 24 contacts the housing, any further application of torque to the screw jack 2 results in both an outward thrust of the extractor toes 42 and an upward lift of the extractor from the interengagement of thread of opening 14 in the body 1 and the thread 23 on the screw jack 2, thereby pulling the bearing cup 7 upward and out of the housing 6.

What is claimed is:

The device of the class described arranged to extract a bearing cup from a housing comprising in combination, a body member having a central portion provided with an axial opening therethrough and other openings therein parallel to the axis of said axial opening, said body member including an enlarged flange-like lower portion around said central portion arranged for bearing engagement with said housing, a screw-jack member threaded into said axial opening and having a tapered lower end portion which normally projects below said body member, an expansible extractor assembly comprising a plurality of relatively movable sectors spaced apart to provide an axial opening extending entirely therethrough which is in axial alignment with said axial opening in the body member, said sectors being so formed that the said opening in the extractor assembly is tapered similarly to said lower end portion of the screw-jack member, each of said sectors also being provided with a threaded hole in its upper side, and screw members disposed in said other openings of the body member having their upper end portions projecting above the body and being of a diameter larger than the diameter of said other openings and having their lower end portions engaged in said threaded holes of the sectors and adapted to support the same within the housing, the lower end portions of said other openings in the body member being of greater diameter than their upper end portions whereby as the screw-jack member expands the said sectors of the extractor assembly, the supporting screw members are permitted to move laterally relative to the body member.

LEO E. LOONEY.